US012601961B1

(12) United States Patent
Tan

(10) Patent No.: US 12,601,961 B1
(45) Date of Patent: Apr. 14, 2026

(54) TELESCOPIC CAMERA DEVICE

(71) Applicant: Xiangan Tan, Wuzhou City (CN)

(72) Inventor: Xiangan Tan, Wuzhou City (CN)

( * ) Notice: Subject to any disclaimer, the term of this patent is extended or adjusted under 35 U.S.C. 154(b) by 0 days.

(21) Appl. No.: 19/081,132

(22) Filed: Mar. 17, 2025

(30) Foreign Application Priority Data

Jan. 27, 2025 (CN) .......................... 202520177684.6

(51) Int. Cl.
*G03B 17/56* (2021.01)
*F16M 11/04* (2006.01)

(52) U.S. Cl.
CPC ......... *G03B 17/561* (2013.01); *F16M 11/046* (2013.01); *F16M 2200/066* (2013.01)

(58) Field of Classification Search
CPC ...... G03B 17/56; G03B 17/561; F16M 11/24; F16M 11/26; F16M 11/28; F16M 11/046; F16M 2200/066; F16B 7/10; E04H 12/182
See application file for complete search history.

(56) References Cited

U.S. PATENT DOCUMENTS

2004/0198433 A1* 10/2004 Lee ........................ H04N 23/54
348/E5.025

FOREIGN PATENT DOCUMENTS

CN 216812412 U * 6/2022

* cited by examiner

*Primary Examiner* — Stephanie E Bloss
*Assistant Examiner* — Fang-Chi Chang
(74) *Attorney, Agent, or Firm* — HOWARD M COHN and Associates, LLC

(57) ABSTRACT
A telescopic camera device includes a housing, a camera, a telescopic rod, and a flexible circuit board. The telescopic rod is arranged in the housing and includes a fixed end and a movable end. The fixed end of the telescopic rod is fixed relative to the housing, while the movable end is extendable away from or retractable toward the housing. The camera is mounted on the movable end of the telescopic rod. The telescopic rod is hollow, and the flexible circuit board is elongated and is installed inside the telescopic rod. A first end of the flexible circuit board is connected to the camera, and a second end is fixed relative to the fixed end of the telescopic rod. The telescopic camera device allows the camera to change positions via extension or retraction of the telescopic rod, enabling flexible use in diverse recording scenarios.

19 Claims, 23 Drawing Sheets

TELESCOPIC CAMERA DEVICE

CROSS-REFERENCE TO RELATED APPLICATIONS

This application claims priority benefits to Chinese Patent Application No. 202520177684.6 filed on Jan. 27, 2025. The contents of the application are incorporated herein by reference.

FIELD

The subject matter herein generally relates to a telescopic camera device.

BACKGROUND

In modern fast-paced work and life, there are many situations where video recording is required for scene documentation. Especially in certain special scenarios, covert recording is necessary to avoid suspicion from the subjects being recorded. Examples include undercover investigations by journalists, covert evidence collection by police, recording for legal case documentation by lawyers, and recording by ordinary citizens encountering criminal acts. Such covert recording typically uses small-sized camera devices, which generally include a housing and a camera. However, the dimensions of these camera devices are limited, and the camera is fixed to the housing, making them inconvenient to use and restricting their applicability to various recording scenarios.

SUMMARY

The objective of the present disclosure is to provide a telescopic camera device. The telescopic camera device includes a housing, a camera, a telescopic rod, and a flexible circuit board. The telescopic rod is arranged in the housing and includes a fixed end and a movable end. The fixed end of the telescopic rod is fixed relative to the housing, while the movable end is extendable away from or retractable toward the housing. The camera is mounted on the movable end of the telescopic rod. The telescopic rod is hollow, and the flexible circuit board is elongated and is installed inside the telescopic rod. A first end of the flexible circuit board is connected to the camera, and a second end is fixed relative to the fixed end of the telescopic rod.

In one or more embodiments of the present disclosure, the flexible circuit board bends and folds when the telescopic rod retracts and straightens when the telescopic rod is extended to a maximum extension position.

In one or more embodiments, taking an extension direction of the telescopic rod as upward, the telescopic rod includes multiple hollow tubes nested in sequence from bottom to top. In each two adjacent hollow tubes, an upper hollow tube of the two adjacent hollow tubes can extend upwards relative to a lower hollow tube of the two adjacent hollow tubes or retracting downwards into the lower hollow tube.

In one or more embodiments, in each two adjacent hollow tubes, an upper limiting structure is provided and configured to prevent the upper hollow tube from detaching from the lower hollow tube during extension of the upper hollow tube.

In one or more embodiments, in each two adjacent hollow tubes, an upper port of the lower hollow tube is smaller than a lower port of the lower hollow tube; and an outer diameter of a lower end of the upper hollow tube is greater than that of an upper end of the lower hollow tube.

In one or more embodiments, in each two adjacent hollow tubes, the upper end of the lower hollow tube is provided with an inwardly curved flange that narrows the upper port; and an outer wall of the lower end of the upper hollow tube is attached with a spacer configured to increase an outer diameter of the lower end of the upper hollow tube; the upper limiting structure includes the flange and the spacer; and the spacer of the upper hollow tube is configured to abut against the flange of the lower hollow tube for positional restriction.

In one or more embodiments, in each two adjacent hollow tubes, a lower limiting structure is provided and configured to restrict downward retraction movement of the upper hollow tube.

In one or more embodiments, a limiting protrusion is arranged on an inner side of the lower end of the lower hollow tube and configured to abut against the upper hollow tube when the upper hollow tube retracts to a lowest retraction position; and the lower limiting structure includes the limiting protrusion.

In one or more embodiments, in each two adjacent hollow tubes, a lower limiting structure is provided and configured to restrict downward retraction movement of the upper hollow tube; and an inner side of the spacer is provided with a limiting protrusion, the part of the lower hollow tube where the spacer 32 is arranged is provided with a through hole, the limiting protrusion is configured to pass through the through hole to enter the lower hollow tube and configured to abut against the upper hollow tube when the upper hollow tube retracts to a lowest retraction position; the lower limiting structure includes the limiting protrusion.

In one or more embodiments, the housing defines a groove and the camera is capable of being received in the groove when the telescopic rod retracts into the housing.

In one or more embodiments, the groove is a through groove, two opposite sides of the camera are provided with two concave surfaces respectively, and the two concave surfaces are exposed outside the housing from two opposite sides of the groove. In one or more embodiments, the camera includes a support base, a lens and a cover;

the support base includes a support portion and a sleeve portion below the support portion; the sleeve portion sleeves on the moveable end of the telescopic rod; the camera is supported on the support portion, and the cover covers the lens; the sleeve portion is communicated with the support portion to allow the flexible circuit board to pass through; and the support portion is provided with insertion pillars, the cover defines insertion holes, and the insertion pillars are configured to be inserted in the insertion holes.

In one or more embodiments, the housing defines an accommodating chamber configured to accommodate the telescopic rod; an upper end of the accommodating chamber is provided with a communicating opening communicated with the groove and configured to allow the moveable end of the telescopic rod to pass through; and a lower end of the accommodating chamber is provided with a clearance opening for the second end of the flexible circuit board to pass out.

In one or more embodiments, one of the hollow tubes at the bottom of the telescopic rod serves as a fixed tube, the accommodating chamber is provided with upper baffle plates and lower baffle plates, and the fixed tube is clamped between the upper baffle plates and the lower baffle plates; and multiple limiting plates are connected between the upper baffle plates and the lower baffle plates, and are spaced apart along an extension direction of the fixed tube, each limiting plate is provided with a recessed position, and the fixed tube is clamped in the recessed position.

In one or more embodiments, the device further includes a control circuit board and a rechargeable battery fixed inside the housing. The second end of the flexible circuit board connects to the control circuit board, which includes a charging interface and control buttons exposed outside the housing. the rechargeable battery is fixed inside the housing and is electrically connected to the control circuit board; and a charging interface is provided on the control circuit board and is exposed outside the housing.

In one or more embodiments, the control circuit board is provided with a plurality of control buttons exposed outside the housing.

In one or more embodiments, a first connecting column and a second connecting column are provided in the housing; the control circuit board is connected on the first connecting column and the second connecting column by screws; and the first connecting column is provided with a positioning portion, both the positioning portion and the second connecting column are provided with threaded holes; the control circuit board is provided with a positioning hole and a connecting hole, the positioning portion is configured to passes through the positioning hole, and the threaded hole of the positioning portion is configured to be connected with one of the screws; and the connecting hole is aligned with the threaded hole of the second connecting column and are connected by the screws.

In one or more embodiments, the housing includes a bottom shell and an upper cover configured to cover the bottom shell and configured to be connected to the bottom shell through a snap-fit structure; the snap-fit structure includes a protrusion arranged on the bottom shell and a fixing portion arranged on the upper cover, and the fixing portion defines an engaging hole; and the fixing portion extends into the bottom shell and the protrusion is engaged in the engaging hole.

A telescopic camera device includes a camera, a telescopic rod and a flexible circuit board. The telescopic rod includes a fixed end and a moveable end; the moveable end of the telescopic rod is configured to extend away from the fixed end and retract towards the fixed end; the camera is configured to be mounted on the moveable end; the telescopic rod is in a hollow structure, the flexible circuit board is elongated and is configured to pass through inside the telescopic rod, a first end of the flexible circuit board is connected to the camera and a second end of the flexible circuit board is fixed relative to the fixed end of the telescopic rod.

In one or more embodiments, the flexible circuit board bends and folds during the telescopic rod retracts and is straightened when the flexible circuit board extends to a maximum extension position; taking an extension direction of the telescopic rod is upward, the telescopic rod includes multiple hollow tubes nested in sequence from bottom to top; in each two adjacent hollow tubes, an upper hollow tube of the two adjacent hollow tubes is capable of extending upwards relative to a lower hollow tube of the two adjacent hollow tubes and retracting downwards into the lower hollow tube; in each two adjacent hollow tubes, an upper end of the lower hollow tube is provided with a flange that curves inward to narrow an upper opening of the lower hollow tube; and an outer wall of a lower end of the upper hollow tube is arranged with a spacer to increase an outer diameter of the lower end of the upper hollow tube; and an inner side of the spacer is provided with a limiting protrusion, a portion of the upper lower tube where the spacer is arranged defines a through hole, the limiting protrusion is configured to pass through the through hole to enter the upper hollow tube.

In the telescopic camera device of the present disclosure, the camera is arranged on the telescopic rod, which allows the camera to change positions via extension or retraction of the telescopic rod. Furthermore, the camera is connected to the flexible circuit board, the flexible circuit board can move along with the extension or retraction of the telescopic rod without affecting usage of the camera, enabling flexible use in diverse recording scenarios, especially in covert recording in special scenarios. For example, the telescopic camera device can be placed in a carry-on backpack with the camera extending outside the backpack to facilitate recording.

Figure 1:
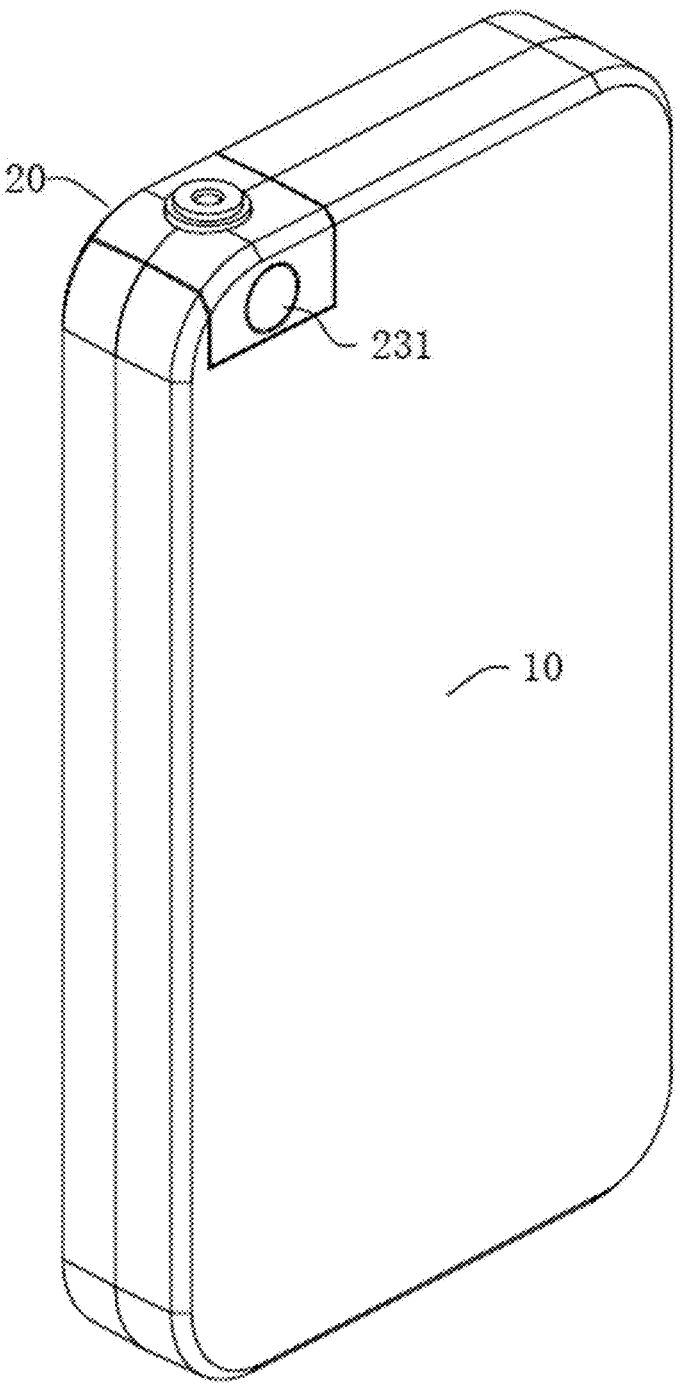
FIG. 1 is a schematic structural diagram of a telescopic camera device according to a first embodiment of the present disclosure.

In the drawing: housing 10, groove 101, communicating opening 102, bottom shell 2, accommodating chamber 111, upper baffle plate 112, lower baffle plate 113, clearance opening 1131, limiting plate 114, recessed position 1141, first connecting column 115, second connecting column 116, protrusion 117, upper cover 12, fixing portion 121, engaging hole 122, camera 20, support base 21, support portion 211, sleeve portion 212; insertion pillar 213, lens 22, cover 23, concave surface 231, telescopic rod 30, hollow tube 31, flange 311, through hole 312, upper port 313, lower port 314, spacer 32, limiting protrusion 321, fixed tube 33; flexible circuit board 40, control circuit board 50, charging interface 51, control button 52, positioning hole 53, connecting hole 54, rechargeable battery 60.

DETAILED DESCRIPTION

The present disclosure is detailed described in conjunction with attached drawings.

Embodiment 1

Figure 2:
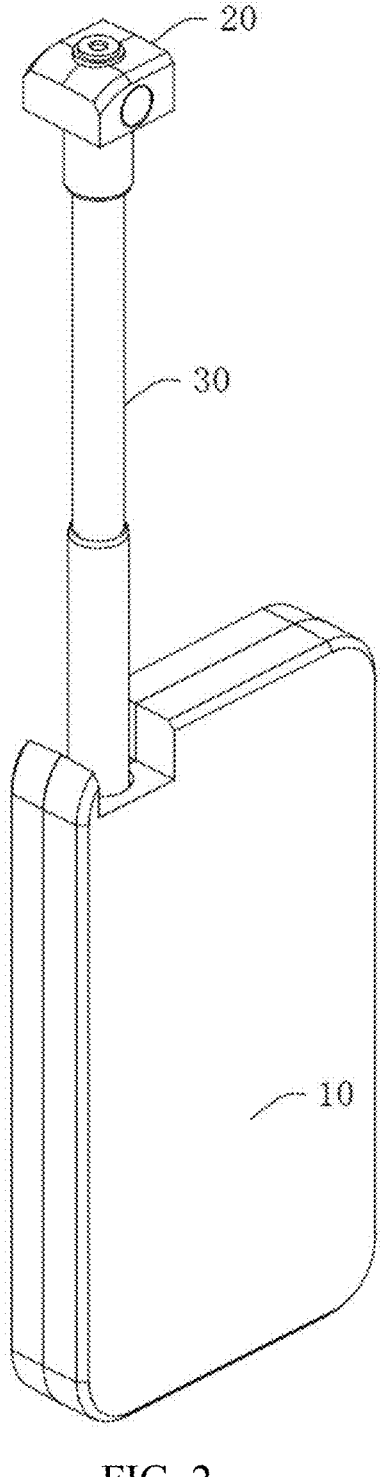
FIG. 2 is a schematic structural diagram of the telescopic camera device of FIG. 1 in an extended state.
Figure 3:
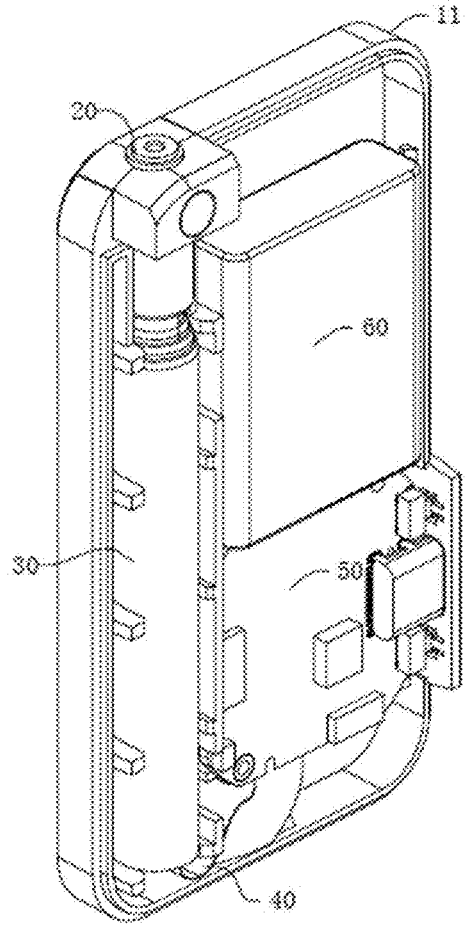
FIG. 3 is a schematic structural diagram of the telescopic camera device of FIG. 1 in a first disassembled state.
Figure 3:
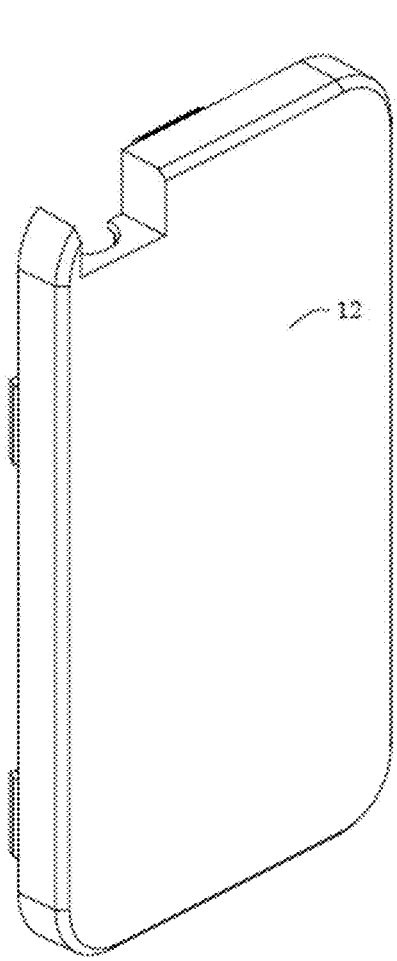
Figure 4:
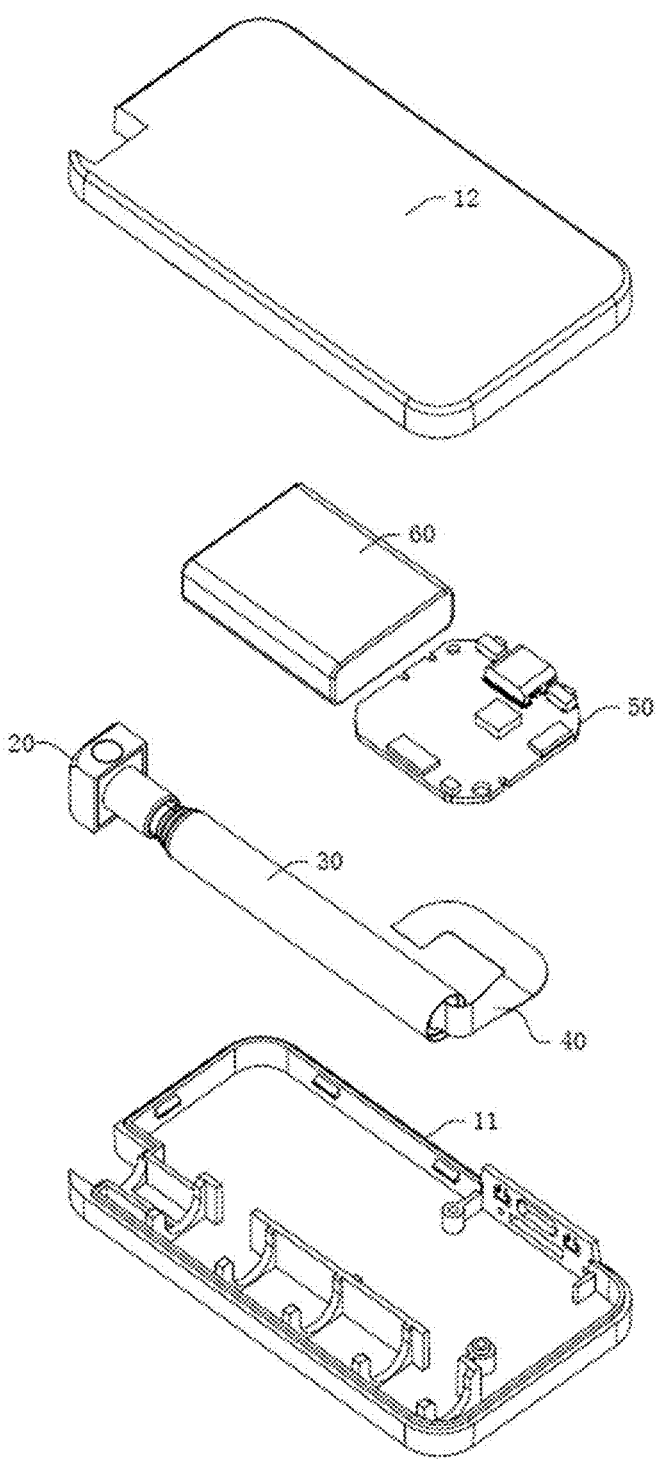
FIG. 4 is a schematic structural diagram of the telescopic camera device of FIG. 1 in a second disassembled state.
Figure 5:
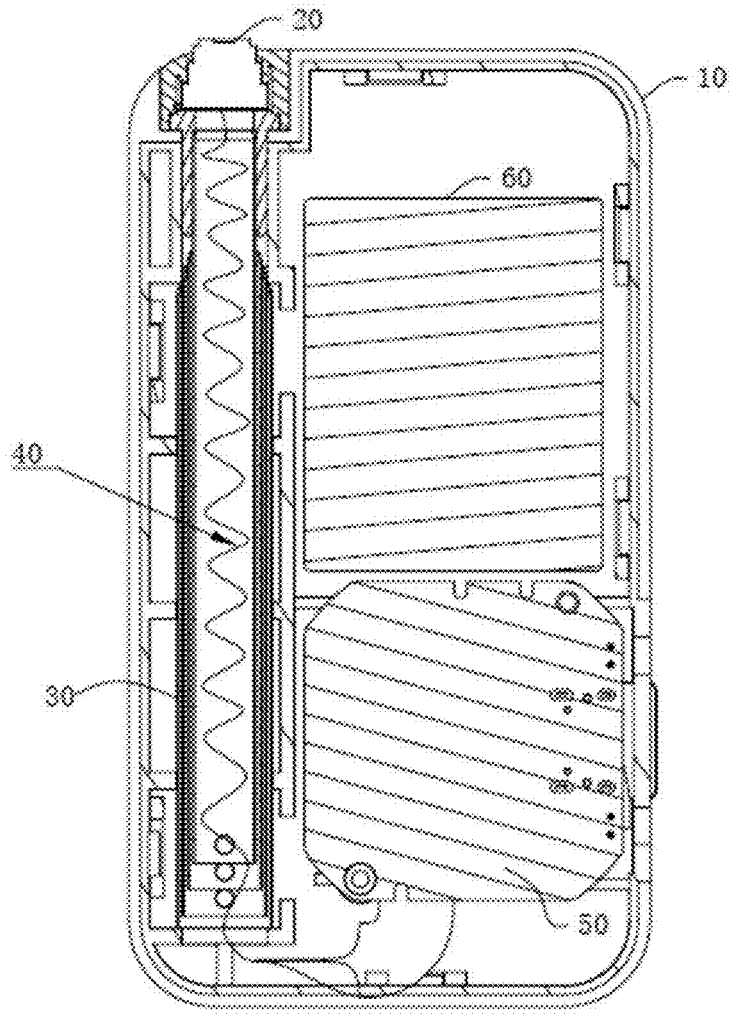
FIG. 5 is a cross-sectional view of the telescopic camera device of FIG. 1.
Figure 6:
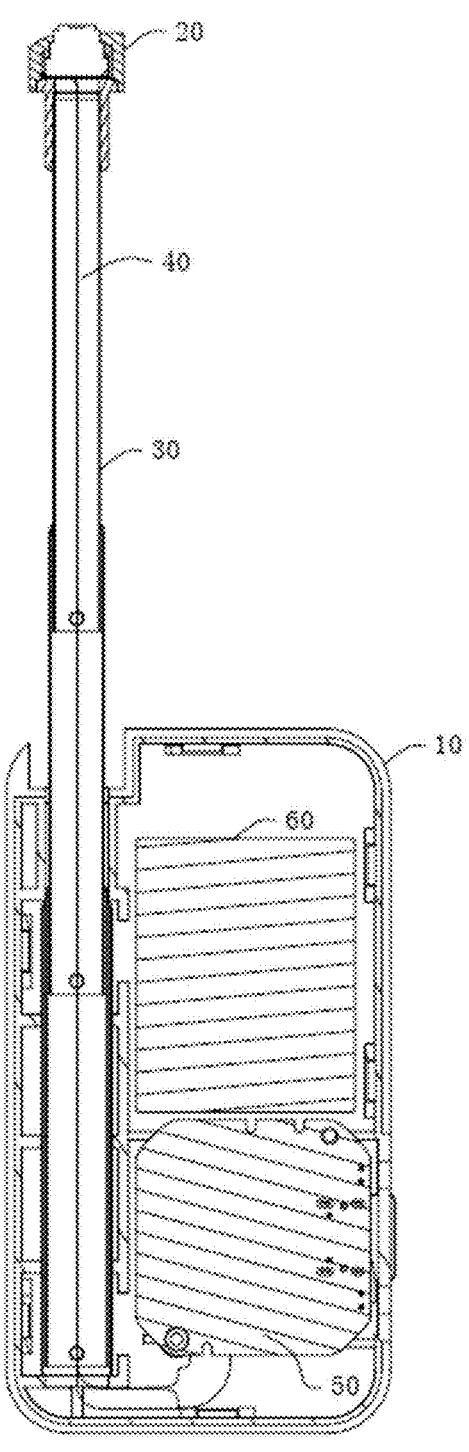
FIG. 6 is a cross-sectional view of the telescopic camera device of FIG. 1 in the extended state.
Figure 7:
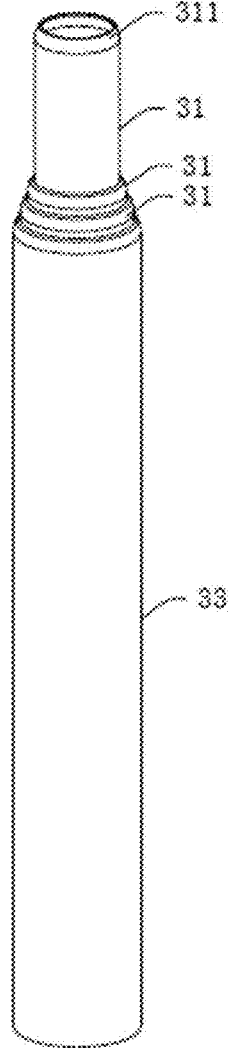
FIG. 7 is a schematic structural diagram of a telescopic rod according to an embodiment of the present disclosure.
Figure 8:
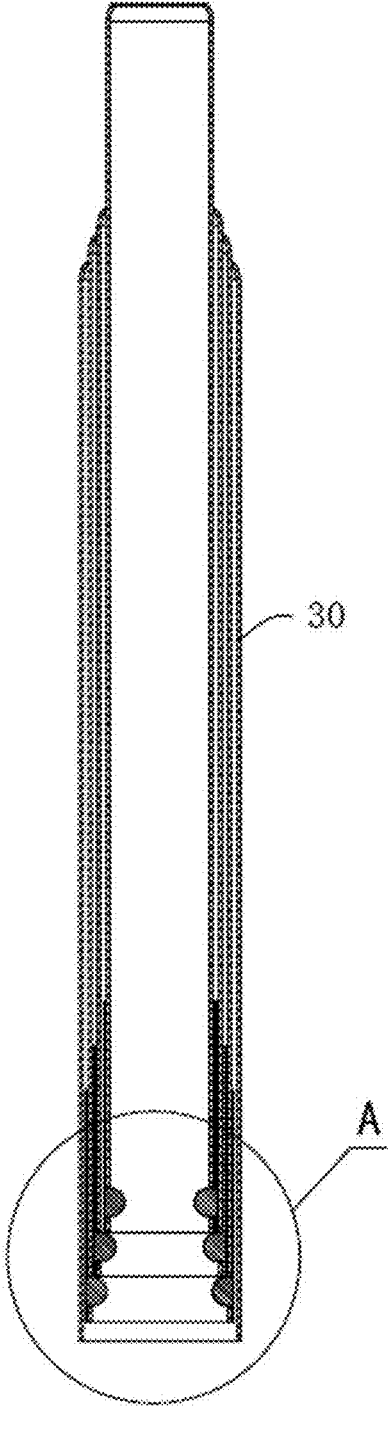
FIG. 8 is a cross-sectional view of the telescopic rod.
Figure 9:
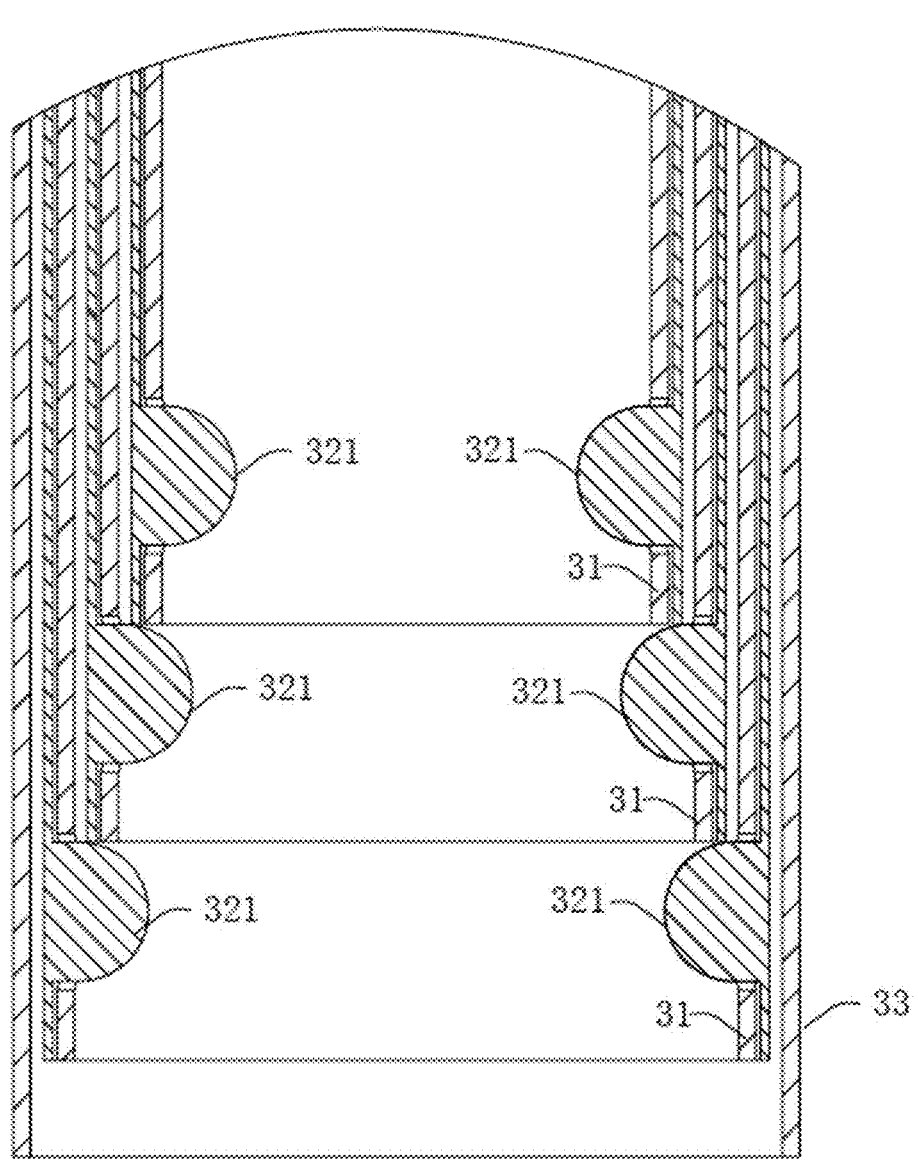
FIG. 9 is a partial enlarged view of the encircled region A in FIG. 8.
Figure 10:
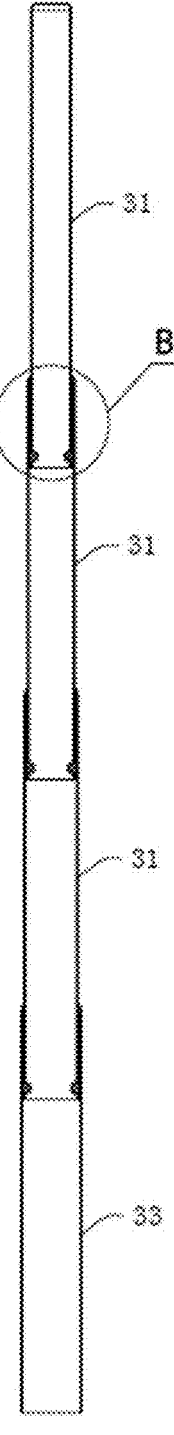
FIG. 10 is a cross-sectional view of the telescopic rod in an extended state.
Figure 11:
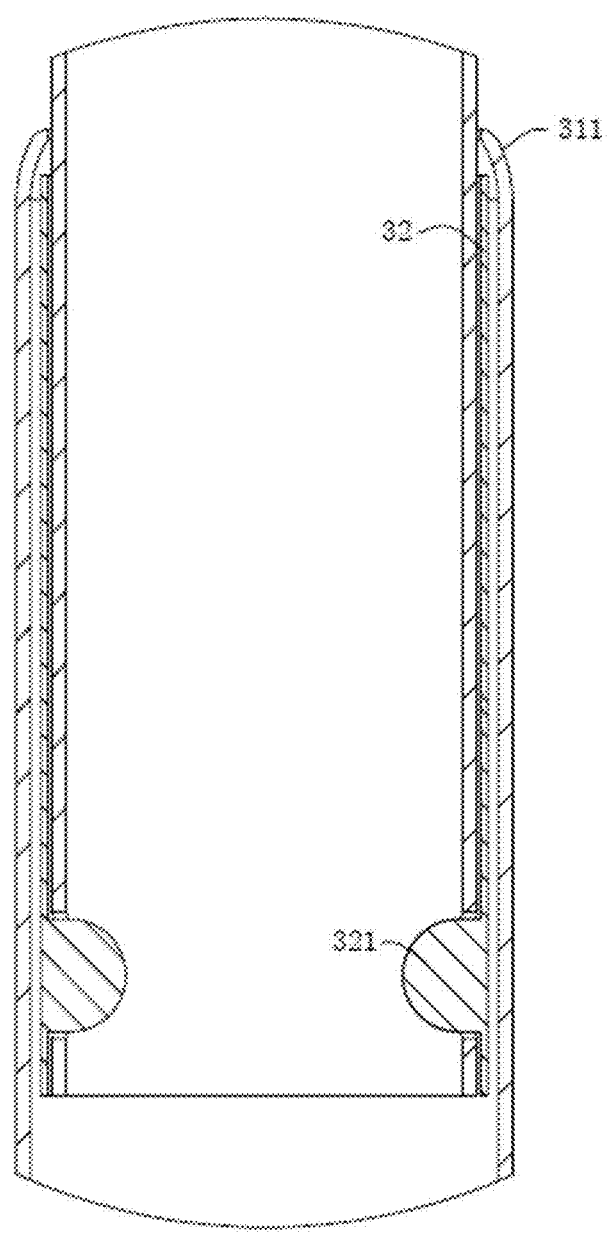
FIG. 11 is a partial enlarged view of the encircled region B in FIG. 10.
Figure 12:
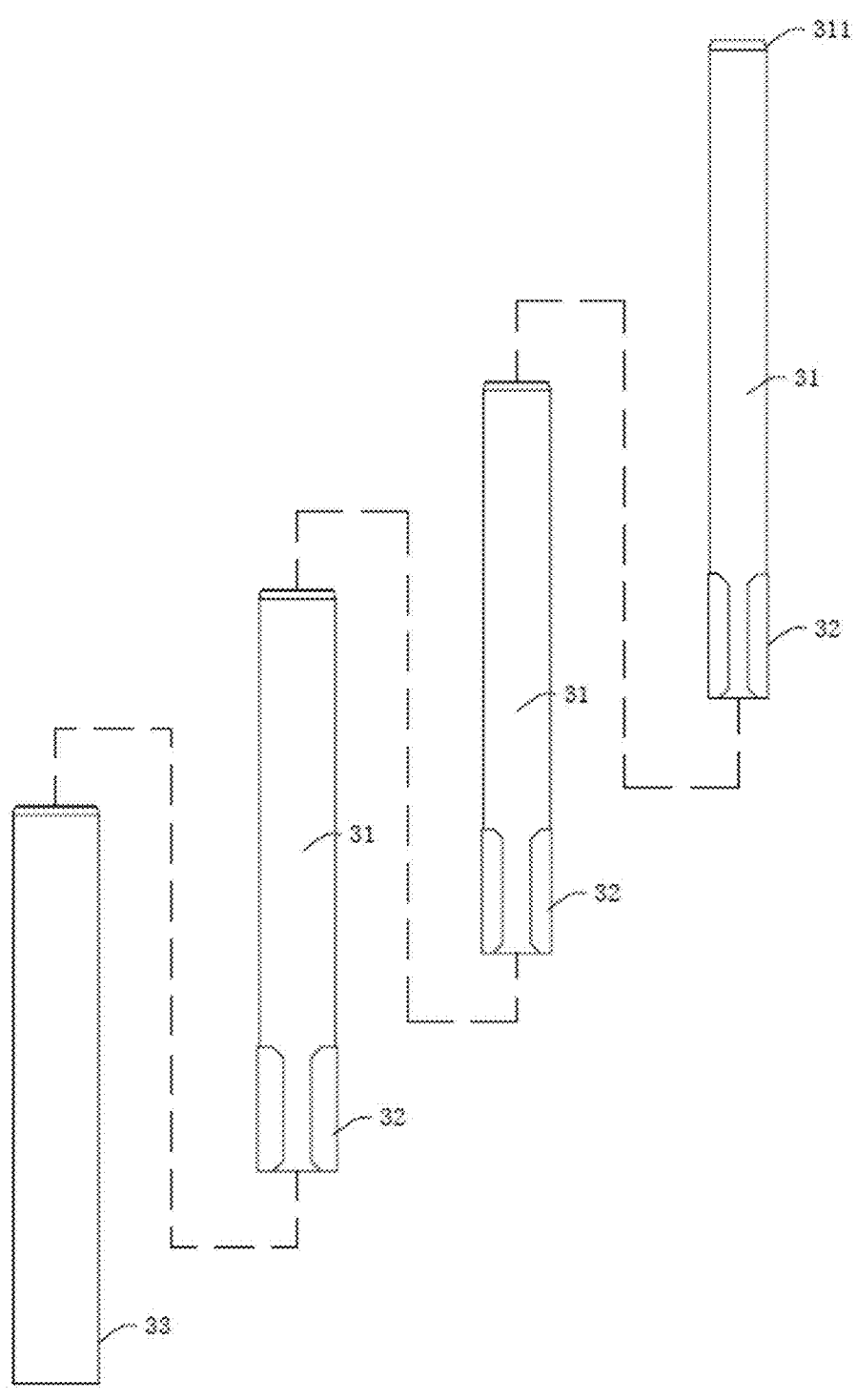
FIG. 12 is an exploded view of the telescopic rod.
Figure 13:
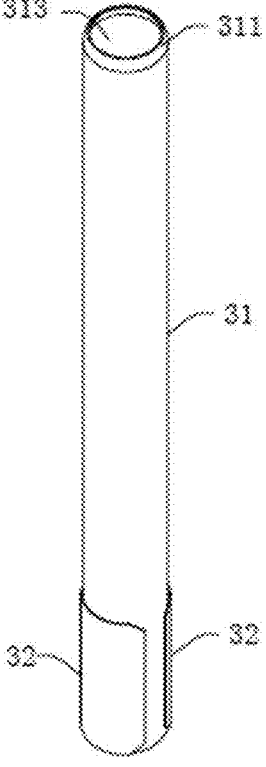
FIGS. 13 and 14 shows assembly of a hollow tube and a spacer in different angles.
Figure 14:
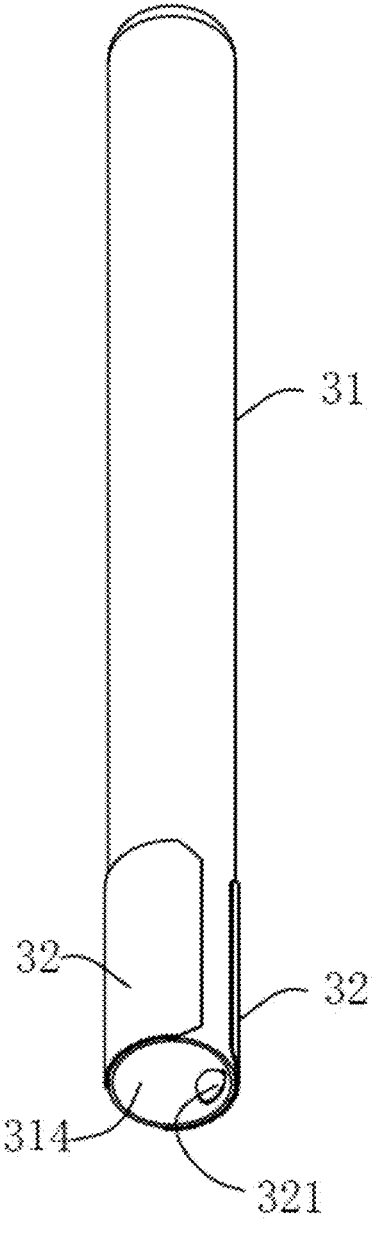
Figure 15:
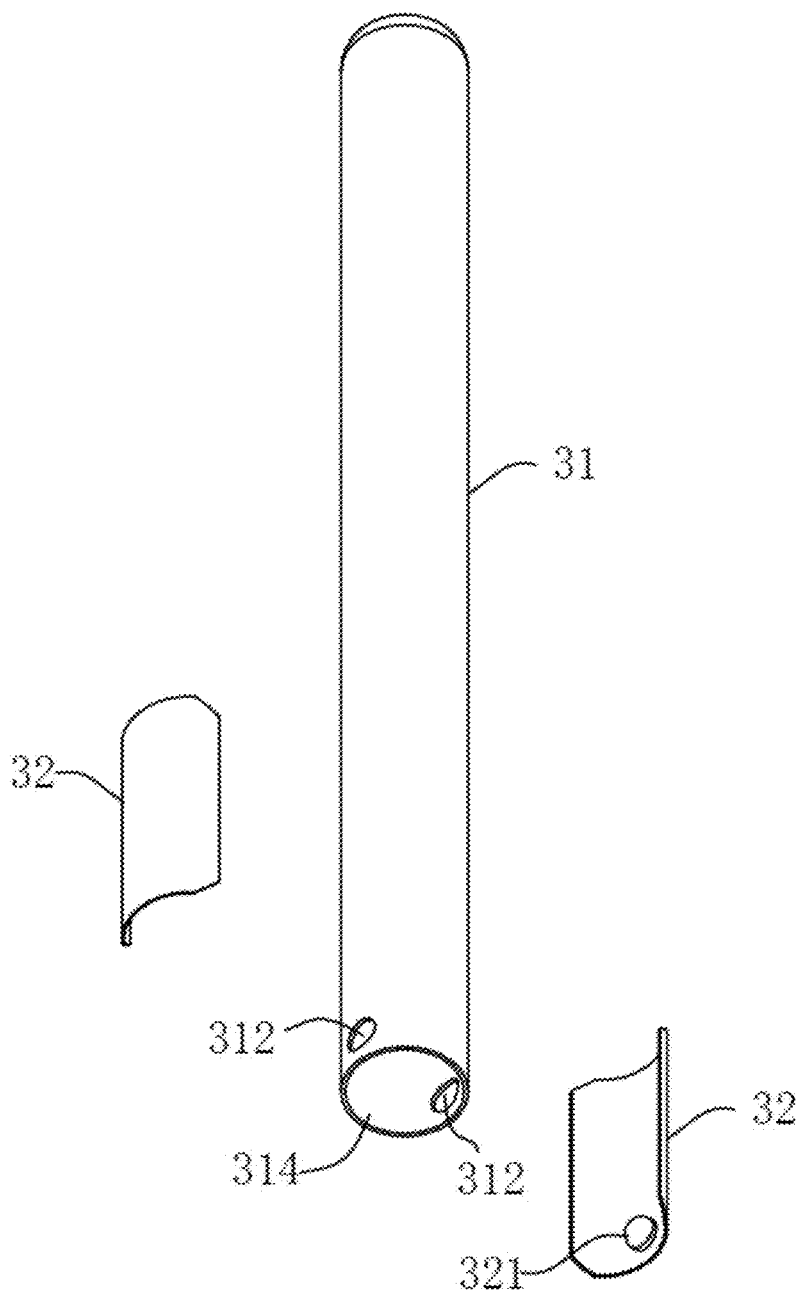
FIG. 15 is a structural disassembly diagram of the hollow tube and the spacer.
Figure 16:
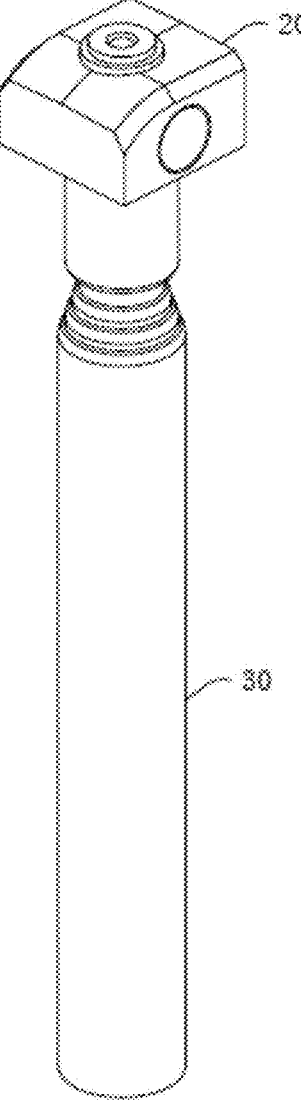
FIG. 16 is assembly of a camera and the telescopic rod according to an embodiment of the present disclosure.
Figure 17:
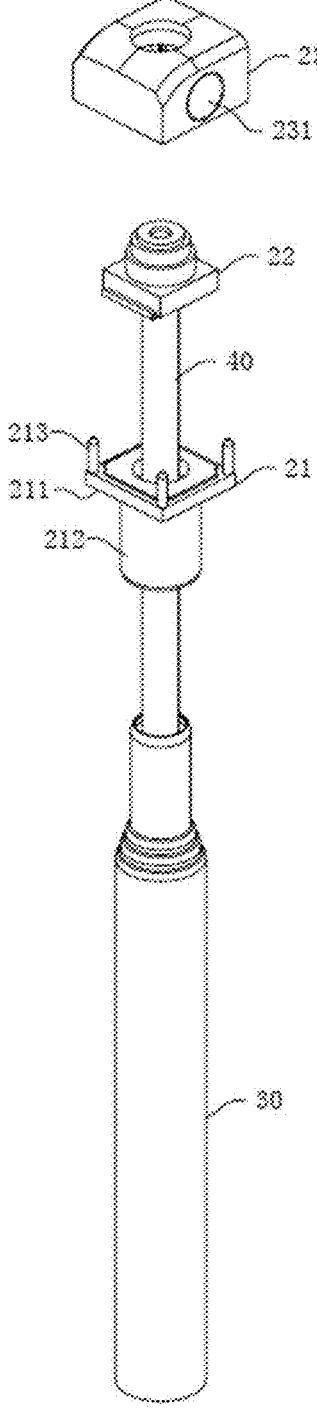
FIG. 17 is a structural disassembly of the camera and the telescopic rod.
Figure 18:
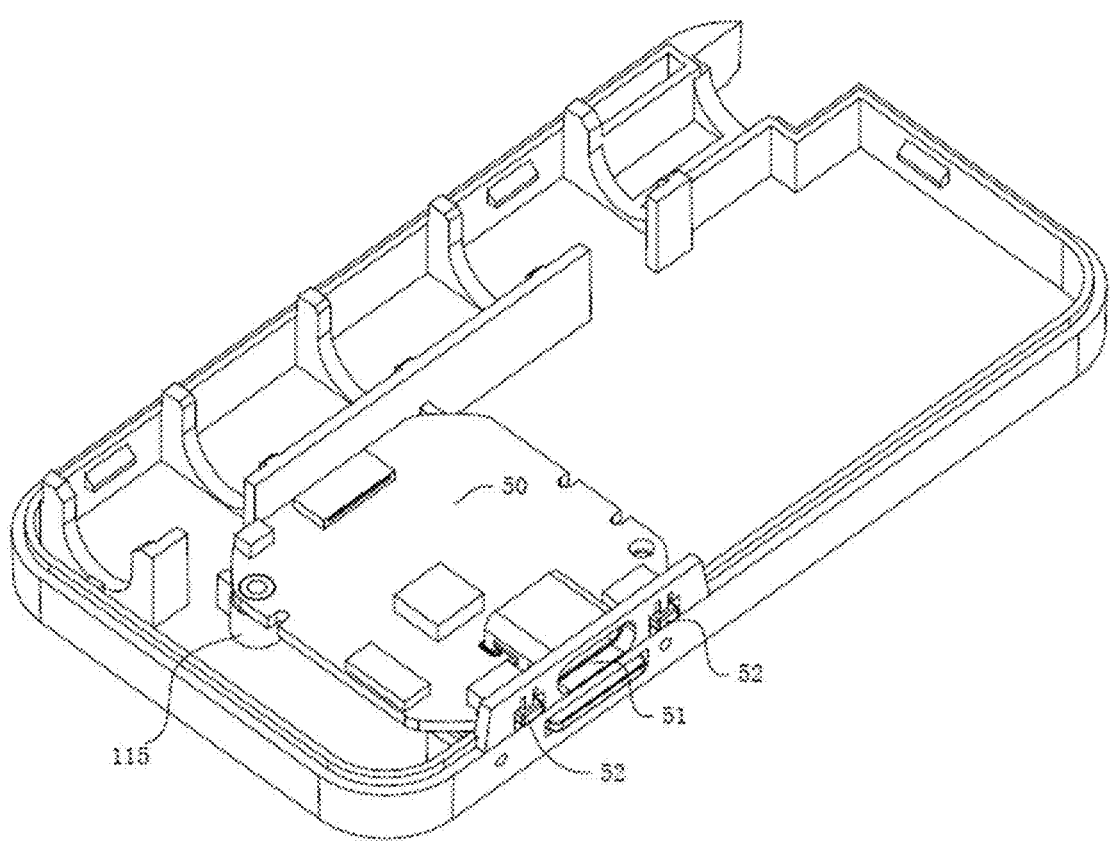
FIG. 18 shows assembly of a bottom shell and a control circuit board according to an embodiment of the present disclosure.
Figure 19:
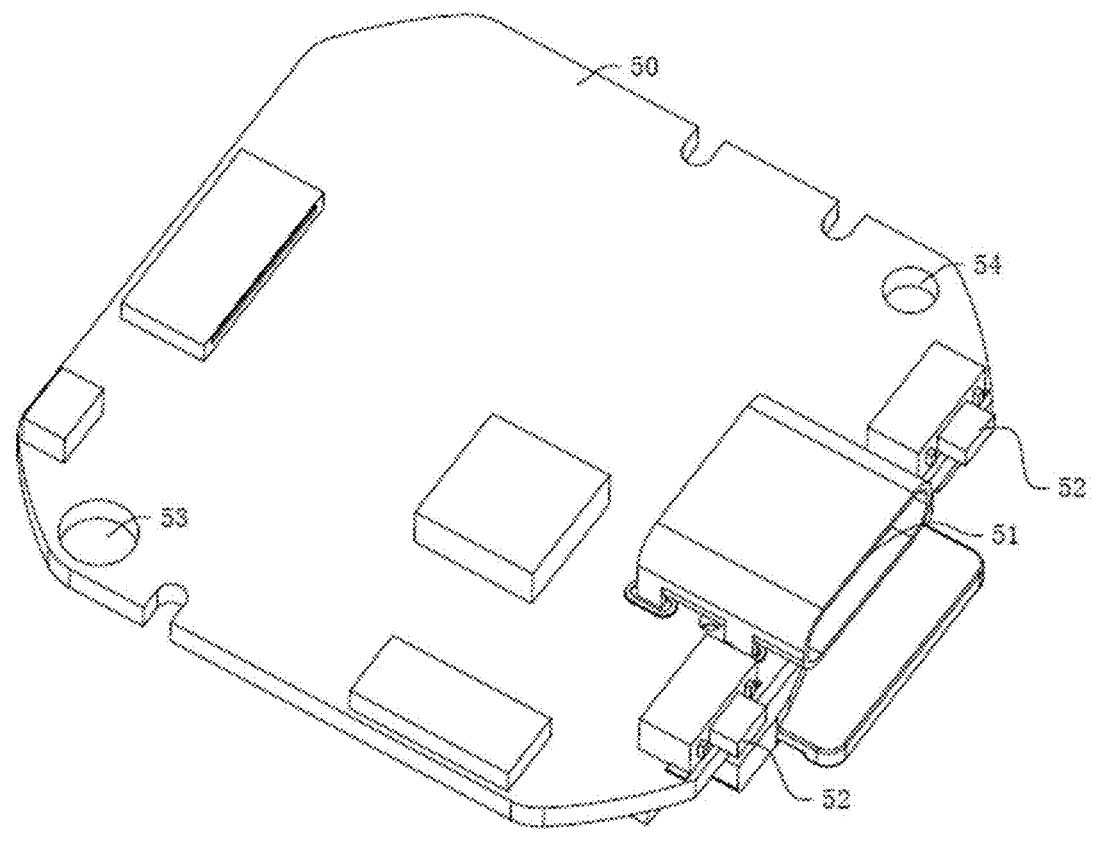
FIG. 19 is a schematic structural diagram of the control circuit board.
Figure 20:
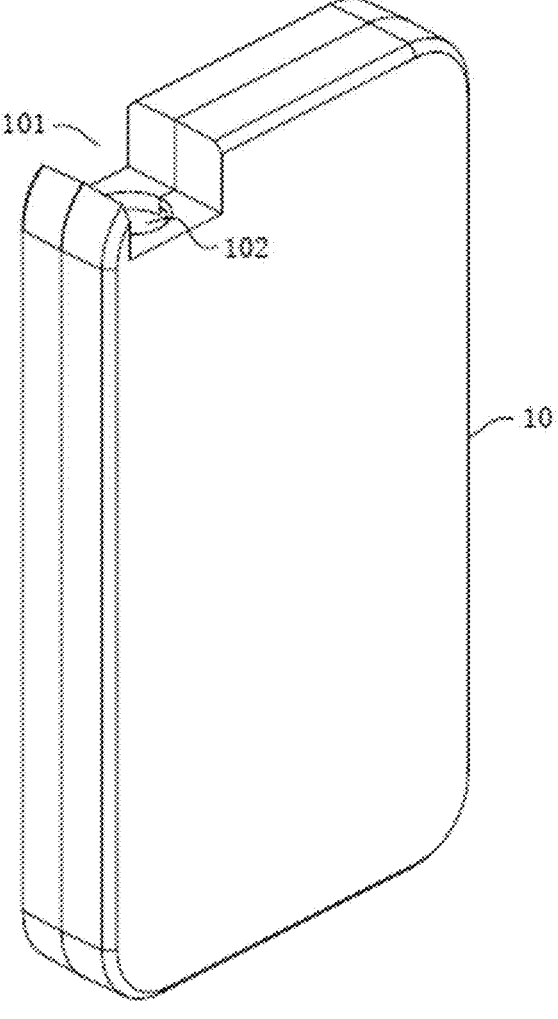
FIG. 20 is a schematic structural diagram of a housing according to an embodiment of the present disclosure.
Figure 21:
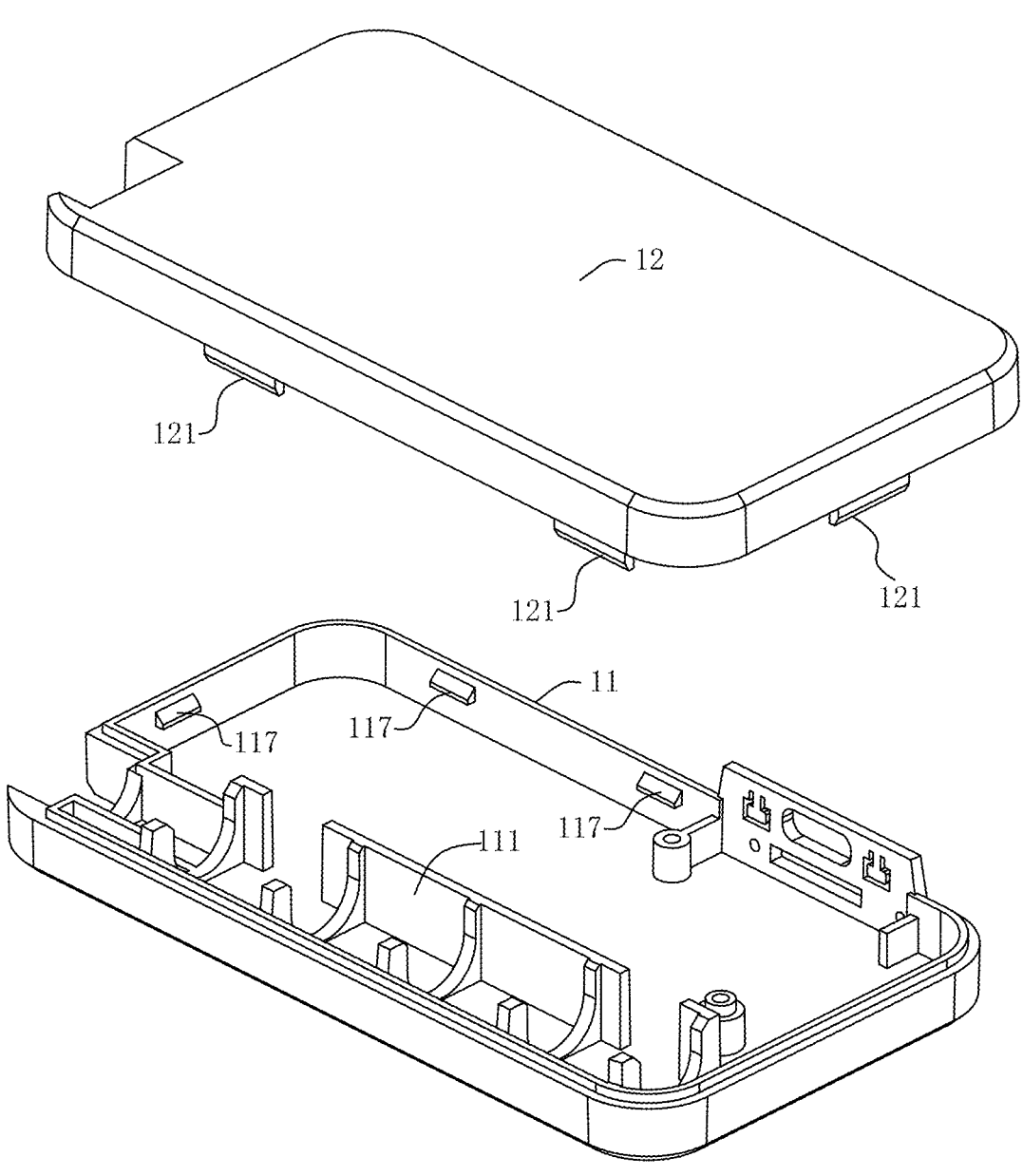
FIG. 21 is an exploded view of the housing.
Figure 22:
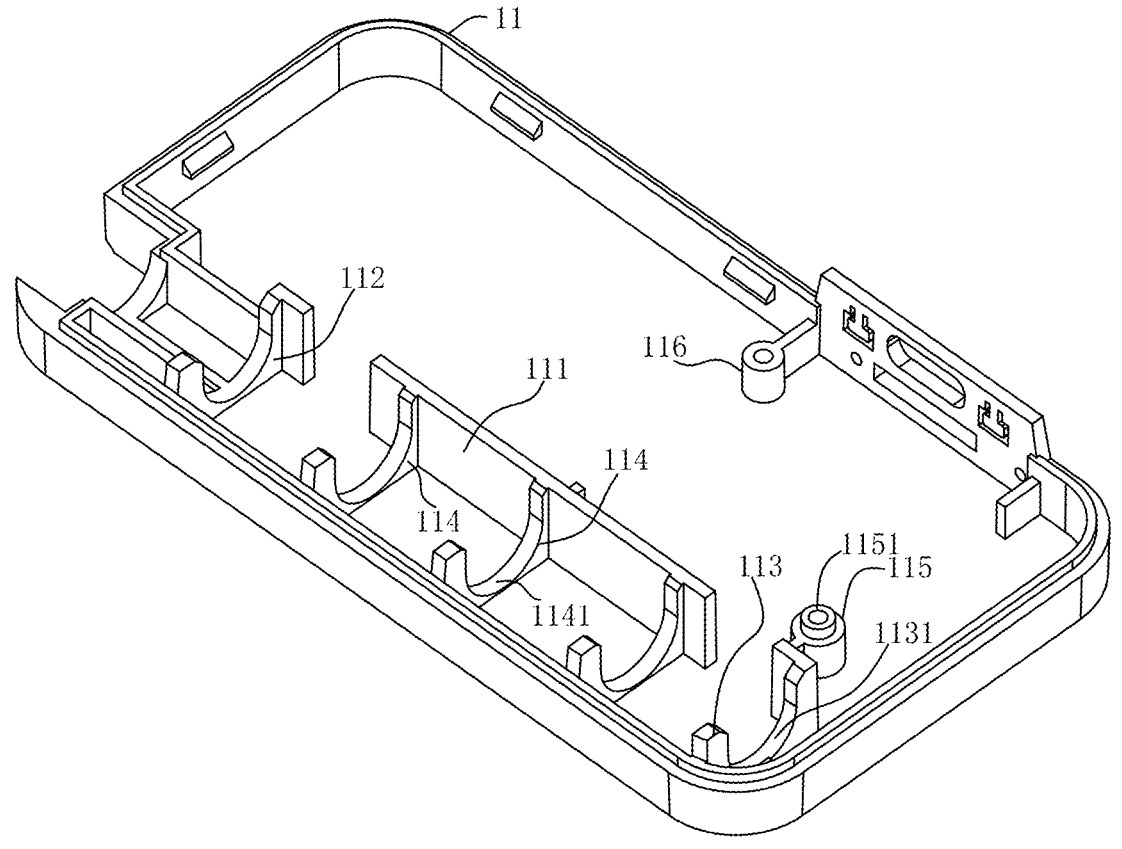
FIG. 22 is a schematic structural diagram of the bottom shell.
Figure 23:
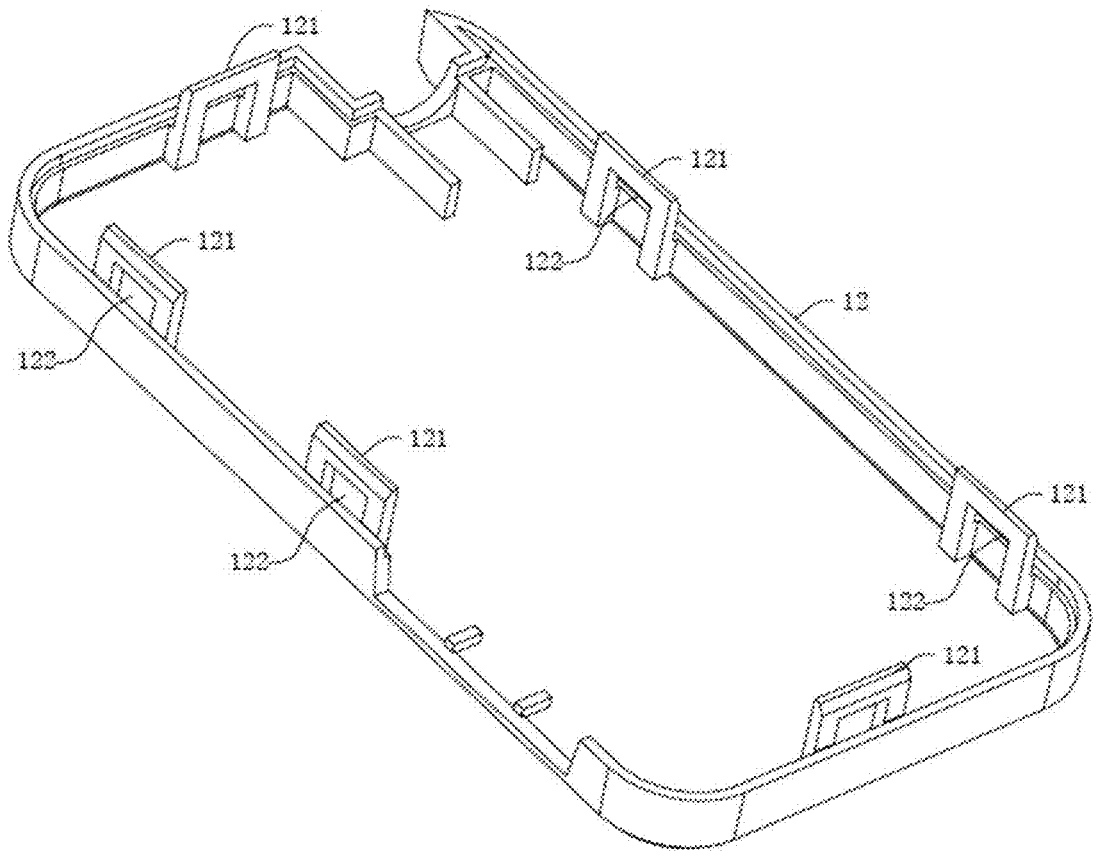
FIG. 23 is a schematic structural diagram of an upper cover according to an embodiment of the present disclosure.

Please referring to FIGS. 1-23, a telescopic camera device provided by an embodiment of the present disclosure includes a housing 10, a camera 20, a telescopic rod 30, a flexible circuit board 40, a control circuit board 50 and a rechargeable battery 60.

The telescopic rod 30 is installed in the housing 10. The telescopic rod 30 includes a fixed end and a movable end; the fixed end of the telescopic rod 30 is fixed relative to the housing 10, while the movable end of the telescopic rod 30 can extend away from the housing 10 or retract towards the housing. The camera 20 is mounted on the movable end of the telescopic rod 30. The movable end of the telescopic rod 30 can retract into the housing 10, thus bring the camera 20 to be retracted into the housing 10.

The telescopic rod 30 is a hollow structure. The flexible circuit board 40 is elongated and is installed inside the telescopic rod 30. A first end of the flexible circuit board 40 is connected to the camera 20, and a second end of the flexible circuit board 40 is fixed relative to the fixed end of the telescopic rod 30.

The flexible circuit board 40 is bent and folded when the telescopic rod 30 is retracted, and the flexible circuit board 40 is straightened when the telescopic rod 30 is extended. When the flexible circuit board 40 is straightened, the moveable end of the telescopic rod 30 extends to a maximum extension position.

In the camera device of the present disclosure, the camera 20 is connected to the housing 10 by the telescopic rod 30, therefore, a position of the camera 20 can be changed by extending or retracting of the telescopic rod 30, which is convenient and flexible, and can be applied to a variety of recording scenes. Specifically, it can be used for secret shooting in special scenes, for example, the camera device can be placed in the carry-on backpack, and the camera can be extended out of the backpack to facilitate shooting.

In addition, the camera 20 is connected to the flexible circuit board 40, which can be installed inside the telescopic rod 30 and be extended to an interior of the housing 10 to be connected to power control components. The flexible circuit board 40 can extend and retract along with the telescopic rod 30 without affecting its usage. Specifically, the first end of the flexible circuit board 40 can extend or retract along with the camera 20 (the moveable end of the telescopic rod 30), achieving synchronous movement of the camera 20 and the flexible circuit board 40.

Taking the direction of extension of the telescopic rod 30 as upward, the telescopic rod 30 includes multiple hollow tubes 31 nested inside one another from bottom to top. For every two adjacent hollow tubes 31, the upper hollow tube 31 can extend upward relative to the lower hollow tube 31 or retract downward into the lower hollow tube 31. In the embodiment, the telescopic rod 30 employs multiple nested hollow tubes 31 coordinated for telescopic movement, where the uppermost hollow tube 31 can extend upward to form the movable end. The structure is simple and easy to implement.

In the embodiment, the telescopic rod 30 includes four hollow tubes 31.

For each two adjacent hollow tubes 31, there is an upper limiting structure to prevent the upper hollow tube 31 from detaching from the lower hollow tube 31 when extended.

Furthermore, in each two adjacent hollow tubes 31, an upper port 313 of the lower hollow tube 31 is smaller than its lower port 314, and the outer diameter of the lower end of the upper hollow tube 31 is larger than the upper port 313 of the lower hollow tube 31, to prevent the upper hollow tube 31 from detaching from the lower hollow tube 31 when extended.

Specifically, in each two adjacent hollow tubes 31, an upper end of the lower hollow tube 31 is provided with an inwardly curved flange 311 that constricts its upper port 313; and an outer wall of a lower end of the upper hollow tube 31 is attached with a spacer 32 for increasing its outer diameter. The upper limiting structure includes the flange 311 and the spacer 32. The spacer 32 of the upper hollow tube 31 is configured to abut against the flange 311 of the adjacent lower hollow tube 31 for positional limitation.

When in use, the maximum extension range of the upper hollow tube 31 is reached when its spacer 32 abuts against the flange 311 of the lower hollow tube 31.

Between each two adjacent hollow tubes 31, there is a lower limiting structure to restrict the downward retraction movement of the upper hollow tube 31. The lower limiting structure includes a limiting protrusion 321. Specifically, an inner side of the spacer 32 is provided with the limiting protrusion 321, and the part of the hollow tube 31 where it abuts against the spacer 32 is provided with a through hole 312. The limiting protrusion 321 passes through the through hole 312 and protrudes inside the hollow tube 31. The limiting protrusion 321 is configured to abut against an adjacent upper hollow tube 31 when the adjacent upper hollow tube 31 retracts to limit a lower limit of the retraction movement. In this embodiment, the limiting protrusion 321 is hemispherical.

It is hard to process the limiting protrusion 321 within the hollow tube 31. The present disclosure forms the limiting protrusion 321 on the spacer 32 and the limiting protrusion 321 is inserted into the hollow tube 31 through the through-hole 312, which allows both upper and lower limiting functions to be achieved simultaneously in a single component, reducing difficulty of processing and installation operations and facilitating implementation.

The spacers 32 on the same hollow tube 31 are symmetrically arranged in pairs (i.e., two spacers are provided symmetrically), which can balance the limiting function and provide high stability.

The housing 10 is provided with a groove 101. When the telescopic rod 30 retracts into the housing 10, the camera 20 is received into the groove 101. When not in use, the camera 20 is hidden within the groove 101, which protects the camera. At this time, the camera can still be used for shooting, enhancing convenience.

The groove 101 is a through groove, and both sides of the camera 20 are provided with concave surfaces 231, which are exposed from both sides of the through groove. The arrangement of the concave surfaces 231 is convenient for fingers to grasp the camera 20 for telescopic movement.

The camera 20 includes a support base 21, a lens 22, and a cover 23. The support base 21 includes a support portion 211 and a sleeve portion 212 located below the support portion 211. The sleeve portion 212 is sleeved onto the movable end of the telescopic rod 30, specifically onto the upper end of the uppermost hollow tube 31 of the telescopic rod 30. The lens 22 is positioned in the middle of the support portion 211, and the cover 23 covers the lens 22. The sleeve portion 212 is communicated with the support portion 211 to allow the flexible circuit board 40 to pass through. an edge of the support portion 211 is provided with insertion pillars 213, and the cover 23 is provided with insertion holes. The insertion pillars 213 are configured to be inserted into the insertion holes. The concave surfaces 231 are provided on both sides of the cover 23. The camera 20 is a miniature camera.

The housing 10 is provided with an accommodating chamber 111 configured to accommodate the telescopic rod 30. An upper end of the accommodating chamber 111 is provided with a communicating opening 102 communicated with the groove 101, which allows the movable end of the telescopic rod 30 to pass through. A lower end of the accommodating chamber 111 is provided with a clearance opening 1131 for the second end of the flexible circuit board 40 to pass out.

The hollow tube 31 at the bottom of the telescopic rod 30 serves as the fixed tube 33. The accommodating chamber 111 is provided with an upper baffle plate 112 and a lower baffle plate 113. The fixed tube 33 is configured to be clamped between the upper baffle plate 112 and the lower baffle plate 113. Multiple limiting plates 114 are connected between the upper baffle plate 112 and the lower baffle plate 113 and are spaced apart along an extension direction of the fixed tube 33. Each limiting plate 114 is provided with a recessed position 1141, into which the fixed tube 33 fits securely. The clearance opening 1131 is located on the lower baffle plate 113.

In the present disclosure, the fixed tube 33 is fixed within the housing 10 through the cooperation of the upper baffle plate 112, the lower baffle plate 113, and the limiting plates 114. Therefore, the lower end of the telescopic rod 30 forms a fixed end fixed in the housing 10. Additionally, the limiting plates 114 are spaced apart, rather than being continuously arranged, which saves material and reduces weight.

The control circuit board 50 is fixed inside the housing 10. The second end of the flexible circuit board 40 is connected to the control circuit board 50 to achieve relative fixation between the second end of the flexible circuit board 40 and the fixed end of the telescopic rod 30. The rechargeable battery 60, fixed inside the housing 10 and electrically connected to the control circuit board 50, supplies power to the control circuit board 50 and the camera 20. The control circuit board 50 is provided with a charging interface 51 configured to connect a power source to recharge the rechargeable battery 60. The control circuit board 50 is provided with a positioning hole 53, an insertion end of which is exposed outside the housing 10. The control circuit board 50 is provided with several control buttons 52 exposed outside the housing 10 for switching operations to control the camera 20 to take photos.

Inside the housing 10, there are a first connecting column 115 and a second connecting column 116. The control circuit board 50 is mounted on the first connecting column 115 and the second connecting column 116 and fixed to them with screws. The first connecting column 115 is provided with a positioning portion 1151, an outer diameter of which is smaller than that of a column body of the first connecting column 115. Both the positioning portion 1151 and the second connecting column 116 are provided with threaded holes. The control circuit board 50 defines a positioning hole 53 and a connecting hole 54. The positioning portion 1151 passes through the positioning hole 53, with screws threaded into the threaded hole on the positioning portion 1151. The connecting hole 54 aligns with the threaded hole of the second connecting column 116 and are connected by screws.

In this embodiment, the first connecting column 115 and the second connecting column 116 are respectively disposed at diagonal positions on the control circuit board 50.

The present disclosure places the positioning structure on the first connecting column 115, achieving the positioning and fixation of the control circuit board 50 with just two connecting columns. The structure is simple and easy to implement.

The housing 10 includes a bottom shell 11 and an upper cover 12. The upper cover 12 covers the bottom shell and is connected to the bottom shell through a snap-fit structure, which is convenient for installation and disassembly for maintenance. Specifically, the snap-fit structure includes a protrusion 117 disposed on an inner wall of the bottom shell 11 and a fixing portion 121 arranged on an edge of the upper cover 12. The fixing portion 121 defines an engaging hole 122. The fixing portion 121 extends into the bottom shell 11, and the protrusion 117 is engaged with the engaging hole 122.

Embodiment 2

Referring to FIGS. 7-17, a telescopic camera device includes a camera 20, a telescopic rod 30, and a flexible circuit board 40.

The telescopic rod 30 includes a fixed end and a movable end. The movable end of the telescopic rod 30 can extend away from the fixed end or retract towards it. The camera 20 is mounted on the movable end of the telescopic rod 30. The telescopic rod 30 is in a hollow structure, and the flexible circuit board 40 is elongated and is inserted within the telescopic rod 30. The first end of the flexible circuit board 40 is connected to the camera 20, while the second end of the flexible circuit board 40 is fixed relative to the fixed end of the telescopic rod 30. When the telescopic rod 30 retracts, the flexible circuit board 40 bends and folds, and when the telescopic rod extends, the flexible circuit board straightens out.

Taking the extension direction of the telescopic rod 30 as upward, the telescopic rod 30 includes multiple hollow tubes 31 nested in sequence from bottom to top. In each two adjacent hollow tubes 31, the upper hollow tube 31 can extend upwards relative to the lower hollow tube 31 or retract downwards into the lower hollow tube 31.

In each two adjacent hollow tubes 31, the upper end of the lower hollow tube 31 is provided with a flange 311 that curves inward to narrow its upper opening. The outer wall of the lower end of the upper hollow tube 31 is attached with the spacer 32 to increase its outer diameter.

When in use, the maximum extension range of the upper hollow tube 31 is reached when the spacer 32 of the upper hollow tube 31 abuts against the flange 311 of the lower hollow tube 31.

The inner side of the spacer 32 is provided with a limiting protrusion 321, and the portion of the hollow tube 31 where it abuts against the spacer 32 is provided with the through hole 312. The limiting protrusion 321 passes through the through hole 312 and enters the hollow tube 31. The limiting protrusion 321 is configured to abut against the upper hollow tube 31 when the upper hollow tube 31 is retracting, thereby limiting the lower limit of retraction movement of the upper hollow tube 31.

The spacers 32 on the same hollow tube 31 are symmetrically arranged in pairs.

In the present disclosure, the camera 20 is arranged on the telescopic rod 30, allowing the position of the camera 20 to be changed along with extension or retraction of the telescopic rod 30. Additionally, the camera 20 is connected to the flexible circuit board 40, which can synchronize with the extension and retraction of the telescopic rod 30 without affecting usage. It is convenient and flexible to use and can be applied to various recording scenarios.

The above-described embodiments merely illustrate several embodiments of the present disclosure, and the description thereof is relatively specific and detailed, but it should not be construed as limiting the scope of patent protection. It should be pointed out that, for ordinary skilled in the art, several modifications and improvements can be made without departing from the concept of the present disclosure, which all fall within the scope of protection of the present disclosure. Therefore, the protection scope of the present disclosure should be determined by appended claims.

What is claimed is:

1. A telescopic camera device, comprising
a housing,
a camera,
a telescopic rod, and
a flexible circuit board,
wherein the telescopic rod is arranged in the housing and comprises a fixed end and a movable end; the fixed end of the telescopic rod is fixed relative to the housing, while the movable end of the telescopic rod is configured to extend away from the housing or retract towards the housing;
the camera is arranged on the moveable end of the telescopic rod;
the telescopic rod is a hollow structure, the flexible circuit board is elongated and is installed inside the telescopic rod; a first end of the flexible circuit board is connected to the camera, and a second end of the flexible circuit board is fixed relative to the fixed end of the telescopic rod;
taking an extension direction of the telescopic rod as upward, the telescopic rod comprises a fixed tube and hollow tubes nested in sequence from bottom to top, and the fixed tube is the fixed end of the telescopic rod;
in each two adjacent hollow tubes, an upper hollow tube thereof is capable of extending upwards relative to a lower hollow tube thereof or retracting downwards into the lower hollow tube thereof;
each of the hollow tubes comprises a spacer disposed on an outer wall of a lower end thereof, a limiting protrusion is disposed on an inner side of the spacer,
each of the hollow tubes defines a through hole provided in a position corresponding to the limiting protrusion; and
in each two adjacent hollow tubes, the limiting protrusion on the spacer of the lower hollow tube is configured to pass through the through hole of the lower hollow tube to enter the lower hollow tube and is configured to abut against the upper hollow tube when the upper hollow tube retracts to a lowest retraction position.

2. The telescopic camera device according to claim 1, wherein the flexible circuit board is bent and folded when the telescopic rod is retracted, and the flexible circuit board is straightened when the telescopic rod is extended to a maximum extension position.

3. The telescopic camera device according to claim 1, wherein
in each two adjacent hollow tubes, an upper limiting structure is provided and configured to prevent the upper hollow tube from detaching from the lower hollow tube during extension of the upper hollow tube.

4. The telescopic camera device according to claim 3, wherein
in each two adjacent hollow tubes, an upper port of the lower hollow tube is smaller than a lower port of the lower hollow tube; and
an outer diameter of a lower end of the upper hollow tube is greater than that of an upper end of the lower hollow tube.

5. The telescopic camera device according to claim 4, wherein
in each of the hollow tubes, an upper end thereof is provided with an inwardly curved flange that narrows an upper port thereof, and the spacer thereof is configured to increase an outer diameter of the lower end thereof;
in each two adjacent hollow tubes, the upper limiting structure is formed by the flange on the lower hollow tube and the spacer on the upper hollow tube, and the spacer of the upper hollow tube is configured to abut against the flange of the lower hollow tube for positional restriction.

6. The telescopic camera device according to claim 1, wherein the housing defines a groove and the camera is capable of being received in the groove when the telescopic rod retracts into the housing.

7. The telescopic camera device according to claim 6, wherein the groove is a through groove, two opposite sides of the camera are provided with two concave surfaces respectively, and the two concave surfaces are exposed outside the housing from two opposite sides of the groove.

8. The telescopic camera device according to claim 7, wherein
the camera comprises a support base, a lens and a cover;
the support base comprises a support portion and a sleeve portion below the support portion;
the sleeve portion sleeves on the moveable end of the telescopic rod; the camera is supported on the support portion, and the cover covers the lens;
the sleeve portion is communicated with the support portion to allow the flexible circuit board to pass through; and
the support portion is provided with insertion pillars, the cover defines insertion holes, and the insertion pillars are configured to be inserted in the insertion holes.

9. The telescopic camera device according to claim 6, wherein
the housing defines an accommodating chamber configured to accommodate the telescopic rod;
an upper end of the accommodating chamber is provided with a communicating opening communicated with the groove and configured to allow the moveable end of the telescopic rod to pass through; and
a lower end of the accommodating chamber is provided with a clearance opening for the second end of the flexible circuit board to pass out.

10. The telescopic camera device according to claim 9, wherein the accommodating chamber is provided with upper baffle plates and lower baffle plates, and the fixed tube is clamped between the upper baffle plates and the lower baffle plates; and multiple limiting plates are connected between the upper baffle plates and the lower baffle plates, and are spaced apart along an extension direction of the fixed tube, each limiting plate is provided with a recessed position, and the fixed tube is clamped in the recessed position.

11. The telescopic camera device according to claim 9, further comprising a control circuit board and a rechargeable battery;

wherein, the control circuit board is fixed in the housing; the second end of the flexible circuit board is connected to the control circuit board;

the rechargeable battery is fixed inside the housing and is electrically connected to the control circuit board; and a charging interface is provided on the control circuit board and is exposed outside the housing.

12. The telescopic camera device according to claim 11, wherein the control circuit board is provided with a plurality of control buttons exposed outside the housing.

13. The telescopic camera device according to claim 12, wherein a first connecting column and a second connecting column are provided in the housing; the control circuit board is connected on the first connecting column and the second connecting column by screws; and the first connecting column is provided with a positioning portion, both the positioning portion and the second connecting column are provided with threaded holes; the control circuit board is provided with a positioning hole and a connecting hole, the positioning portion is configured to-pass through the positioning hole, and the threaded hole of the positioning portion is configured to be connected with one of the screws; and the connecting hole is aligned with the threaded hole of the second connecting column and are connected by another one of the screws.

14. The telescopic camera device according to claim 13, wherein the housing comprises a bottom shell and an upper cover configured to cover the bottom shell and configured to be connected to the bottom shell through a snap-fit structure;

the snap-fit structure comprises a protrusion arranged on the bottom shell and a fixing portion arranged on the upper cover, and the fixing portion defines an engaging hole; and the fixing portion extends into the bottom shell and the protrusion is engaged in the engaging hole.

15. A telescopic camera device, comprising a camera, a telescopic rod and a flexible circuit board;

wherein the telescopic rod comprises a fixed end and a moveable end; the moveable end of the telescopic rod is configured to extend away from the fixed end and retract towards the fixed end;

the camera is configured to be mounted on the moveable end;

the telescopic rod is in a hollow structure, the flexible circuit board is elongated and is configured to pass through inside the telescopic rod, a first end of the flexible circuit board is connected to the camera and a second end of the flexible circuit board is fixed relative to the fixed end of the telescopic rod;

taking an extension direction of the telescopic rod as upward, the telescopic rod comprises a fixed tube and hollow tubes nested in sequence from bottom to top, and the fixed tube is the fixed end of the telescopic rod;

in each two adjacent hollow tubes, an upper hollow tube thereof is capable of extending upwards relative to a lower hollow tube thereof or retracting downwards into the lower hollow tube thereof;

each of the hollow tubes comprises a spacer disposed on an outer wall of a lower end thereof, a limiting protrusion is disposed on an inner side of the spacer, each of the hollow tubes defines a through hole provided in a position corresponding to the limiting protrusion; and in each two adjacent hollow tubes, the limiting protrusion on the spacer of the lower hollow tube is configured to pass through the through hole of the lower hollow tube to enter the lower hollow tube and is configured to abut against the upper hollow tube when the upper hollow tube retracts to a lowest retraction position.

16. A telescopic camera device, comprising
a housing,
a camera,
a telescopic rod, and
a flexible circuit board, wherein the telescopic rod is arranged in the housing and comprises a fixed end and a movable end; the fixed end of the telescopic rod is fixed relative to the housing, while the movable end of the telescopic rod is configured to extend away from the housing or retract towards the housing;

the camera is arranged on the moveable end of the telescopic rod;

the telescopic rod is a hollow structure, the flexible circuit board is elongated and is installed inside the telescopic rod; a first end of the flexible circuit board is connected to the camera, and a second end of the flexible circuit board is fixed relative to the fixed end of the telescopic rod;

the housing defines a groove and the camera is capable of being received in the groove when the telescopic rod retracts into the housing;

the camera comprises a support base, a lens and a cover;

the support base comprises a support portion and a sleeve portion below the support portion;

the sleeve portion sleeves on the moveable end of the telescopic rod; the camera is supported on the support portion, and the cover covers the lens;

the sleeve portion is communicated with the support portion to allow the flexible circuit board to pass through; and the support portion is provided with insertion pillars, the cover defines insertion holes, and the insertion pillars are configured to be inserted in the insertion holes.

17. The telescopic camera device according to claim 16, wherein the housing defines an accommodating chamber configured to accommodate the telescopic rod;

an upper end of the accommodating chamber is provided with a communicating opening communicated with the groove and configured to allow the moveable end of the telescopic rod to pass through; and a lower end of the accommodating chamber is provided with a clearance opening for the second end of the flexible circuit board to pass out.

18. The telescopic camera device according to claim 17, wherein the telescopic rod comprises a fixed tube and hollow tubes nested in sequence from bottom to top, and the fixed tube is the fixed end of the telescopic rod; the accommodating chamber is provided with upper baffle plates and lower baffle plates, and the fixed tube is clamped between the upper baffle plates and the lower baffle plates; and multiple limiting plates are connected between the upper baffle plates and the lower baffle plates, and are spaced apart along an extension direction of the fixed tube, each limiting plate is provided with a recessed position, and the fixed tube is clamped in the recessed position.

19. A telescopic camera device, comprising a housing, a camera, a telescopic rod, and a flexible circuit board, wherein the telescopic rod is arranged in the housing and comprises a fixed end and a movable end; the fixed end of the telescopic rod is fixed relative to the housing, while the movable end of the telescopic rod is configured to extend away from the housing or retract towards the housing;

the camera is arranged on the moveable end of the telescopic rod;

the telescopic rod is a hollow structure, the flexible circuit board is elongated and is installed inside the telescopic rod; a first end of the flexible circuit board is connected to the camera, and a second end of the flexible circuit board is fixed relative to the fixed end of the telescopic rod;

the housing defines a groove and the camera is capable of being received in the groove when the telescopic rod retracts into the housing;

the housing defines an accommodating chamber configured to accommodate the telescopic rod;

an upper end of the accommodating chamber is provided with a communicating opening communicated with the groove and configured to allow the moveable end of the telescopic rod to pass through;

a lower end of the accommodating chamber is provided with a clearance opening for the second end of the flexible circuit board to pass out;

the telescopic rod comprises a fixed tube and hollow tubes nested in sequence from bottom to top, and the fixed tube is the fixed end of the telescopic rod; the accommodating chamber is provided with upper baffle plates and lower baffle plates, and the fixed tube is clamped between the upper baffle plates and the lower baffle plates; and multiple limiting plates are connected between the upper baffle plates and the lower baffle plates, and are spaced apart along an extension direction of the fixed tube, each limiting plate is provided with a recessed position, and the fixed tube is clamped in the recessed position.

* * * * *